(12) United States Patent
Doura et al.

(10) Patent No.: US 11,959,408 B2
(45) Date of Patent: Apr. 16, 2024

(54) EXHAUST SYSTEM FOR AN AMMONIA-BURNING COMBUSTION ENGINE

(71) Applicant: JOHNSON MATTHEY PUBLIC LIMITED COMPANY, London (GB)

(72) Inventors: Kevin Doura, Audubon, PA (US); John Kilmartin, Reading (GB); Jing Lu, Wayne, PA (US); Nicholas McNamara, Wayne, PA (US); Thomas Yeh, Audubon, PA (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/169,595

(22) Filed: Feb. 15, 2023

(65) Prior Publication Data

US 2023/0265772 A1      Aug. 24, 2023

Related U.S. Application Data

(60) Provisional application No. 63/268,235, filed on Feb. 18, 2022.

(30) Foreign Application Priority Data

Apr. 14, 2022   (EP) .................................... 22168486

(51) Int. Cl.
*F01N 3/10*     (2006.01)
*B01D 53/94*    (2006.01)
(Continued)

(52) U.S. Cl.
CPC ........... *F01N 3/101* (2013.01); *B01D 53/945* (2013.01); *B01D 53/9454* (2013.01);
(Continued)

(58) Field of Classification Search
CPC . F01N 3/101; F01N 2510/068; F01N 2610/04
See application file for complete search history.

(56) References Cited

U.S. PATENT DOCUMENTS 8,166,926 B2   5/2012   Sasaki
8,370,049 B1   2/2013   Shimizu
(Continued)

FOREIGN PATENT DOCUMENTS

CN   102497927 A   6/2012
CN   102859170 A   1/2013
(Continued)

OTHER PUBLICATIONS

Machine translation of EP-4015064-A1, accessed Apr. 20, 2023. (Year: 2023).*

(Continued)

*Primary Examiner* — Jonathan R Matthias
(74) *Attorney, Agent, or Firm* — BakerHostetler

(57) ABSTRACT

The present invention relates to a system for ammonia combustion and exhaust gas treatment, the system comprising: an internal combustion engine for combusting ammonia; and an exhaust system comprising an intake for receiving an exhaust gas from the combustion engine, an upstream injector for adding hydrogen gas to the exhaust gas and a downstream catalyst article, wherein the downstream catalyst article comprises a three-way catalyst (TWC) composition. The invention further relates to a method for the treatment of an exhaust gas from an ammonia internal combustion engine.

10 Claims, 1 Drawing Sheet

(51) Int. Cl.
*B01J 21/04* (2006.01)
*B01J 23/46* (2006.01)

(52) U.S. Cl.
CPC .......... *B01D 53/9477* (2013.01); *B01J 21/04* (2013.01); *B01J 23/462* (2013.01); *B01D 2255/1026* (2013.01); *B01D 2255/9155* (2013.01); *F01N 2510/068* (2013.01); *F01N 2560/026* (2013.01); *F01N 2610/04* (2013.01); *F01N 2610/1406* (2013.01); *F01N 2900/1402* (2013.01)

(56) References Cited

U.S. PATENT DOCUMENTS

| | | |
|---|---|---|
| 2004/0237512 A1 | 12/2004 | Tang |
| 2008/0308056 A1 | 12/2008 | Schiltz |
| 2011/0020201 A1 | 1/2011 | Luo |
| 2011/0259290 A1 | 10/2011 | Michikawauchi |
| 2011/0265455 A1* | 11/2011 | Hirota ................. F02D 19/0644 60/285 |
| 2015/0118138 A1 | 4/2015 | Jung |
| 2017/0044952 A1* | 2/2017 | Wolf ........................ C25B 1/04 |
| 2021/0102486 A1 | 4/2021 | Sung |

FOREIGN PATENT DOCUMENTS

| | | | |
|---|---|---|---|
| CN | 110709590 A | 1/2020 | |
| EP | 4015064 A1 * | 6/2022 | |
| SE | 509787 C2 | 3/1999 | |
| WO | WO-9904145 A1 * | 1/1999 | ........... F01N 3/2033 |
| WO | 9947260 A1 | 9/1999 | |
| WO | 2011080525 A1 | 7/2011 | |
| WO | 2014195685 A1 | 12/2014 | |
| WO | 2015145122 A2 | 10/2015 | |
| WO | WO-2022055855 A1 * | 3/2022 | |

OTHER PUBLICATIONS

Mounaïm-Rousselle et al. "Operating limits for Ammonia Fuel Spark-ignition Engine", Energies 2021, 14(14), 4141.

* cited by examiner

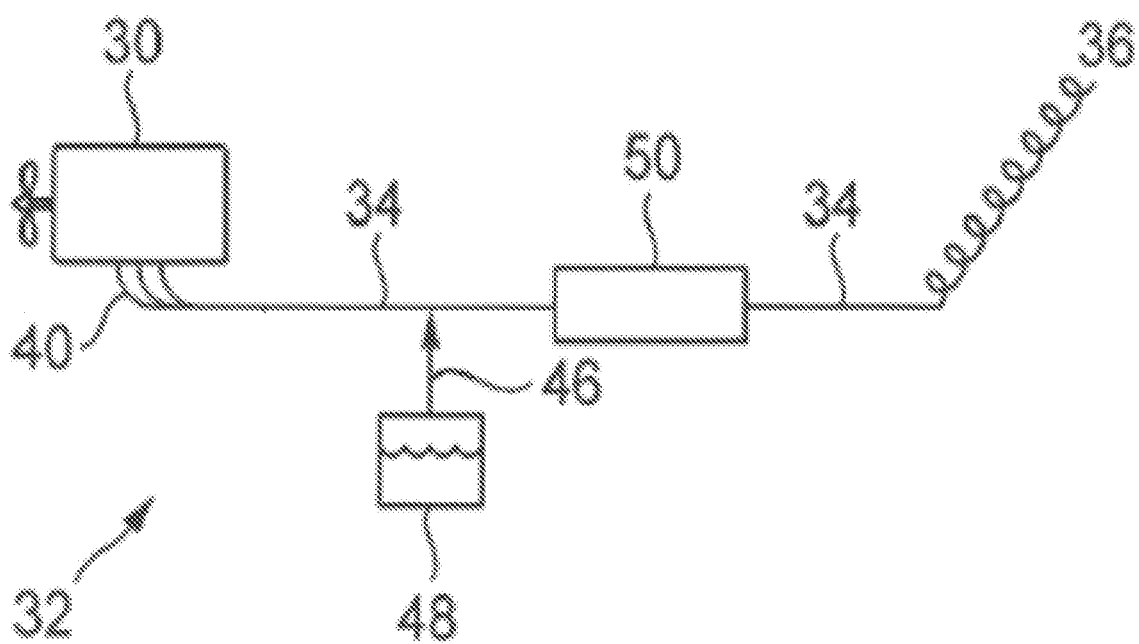

EXHAUST SYSTEM FOR AN AMMONIA-BURNING COMBUSTION ENGINE

The present invention relates to an exhaust system for an ammonia-burning combustion engine and, in particular, to a complete system which overcomes deficiencies in adapting known catalyst articles from gasoline exhaust treatment applications.

While hydrogen ($H_2$) has been proposed for use as an alternative fuel for internal combustion engines, ammonia ($NH_3$) is also currently receiving an increased interest as a potential renewable carbon-free energy carrier. It is both considered as a fuel for direct use in a combustion system or fuel cell, or as an efficient hydrogen carrier (17.8% hydrogen content by mass) when it is decomposed.

Anhydrous ammonia ($NH_3$) stores and handles very much like liquefied petroleum gas (LPG). For example, ammonia has a boiling temperature of about −33.5° C. at 1.013 bar (1 atmosphere). Similarly, propane, the main constituent of (LPG) has a boiling temperature of about −42.1° C. Furthermore, ammonia is carbon free and renewable in addition to being reasonably practical to handle, store and transport.

Also, from an energy density standpoint, ammonia is much better than even liquefied hydrogen. On a volume basis, the energy density of liquefied hydrogen is about 8,491 kJ/liter compared to liquefied ammonia having an energy density of about 11,308 kJ/liter.

As indicated by its chemical formula, $NH_3$, ammonia is one (1) part nitrogen and three (3) parts hydrogen. By atomic weight, ammonia is fourteen (14) parts nitrogen to three (3) parts hydrogen, or approximately 82% nitrogen to 18% hydrogen. However, while ammonia is only 18% hydrogen, the fact that there are 3 hydrogen atoms attached to a single nitrogen atom allows ammonia to contain significantly more hydrogen by volume than even liquefied hydrogen.

A stoichiometric combustion with 100% theoretical air for ammonia combustion is as follows:

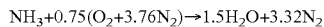

$$NH_3 + 0.75(O_2 + 3.76N_2) \rightarrow 1.5H_2O + 3.32N_2$$

When the pure ammonia is ideally combusted, $H_2O$ and $N_2$ are formed. However, this kind of combustion is practically impossible. Any fuel, including ammonia, needs to be combusted with excess air (which will make the theoretical air more than 100%). On the other hand, under actual conditions, the reaction kinetics of ammonia combustion tend to form nitric oxide.

U.S. Pat. No. 8,166,926 describes an internal combustion engine with ammonia fuel. In particular, it discloses a method which comprises producing exhaust gas from the internal combustion engine and heating the ammonia with the exhaust gas to provide the ammonia at a selected temperature and pressure. This helps to facilitate the operation of the combustion engine. However, the application is silent on the treatment of gaseous components of the exhaust gases.

One problem with ammonia is flame propagation. Ammonia has a minimum ignition energy of about 680 mJ. By contrast, hydrogen has a minimum ignition energy of about 0.011 to 0.017 mJ and gasoline has a minimum ignition energy of 0.8 mJ. Consequently, the flame propagation speed of ammonia/air mixture is slow and it is difficult to realize high cycle efficiency because of the long combustion duration. A solution to this problem is to use a fuel which comprises both ammonia and hydrogen.

US20080308056 describes a hydrogen and ammonia fueled internal combustion engine. In particular, it provides a dual fuel system controlled by an electronic control system to adjust as desired the proportion of hydrogen and ammonia being used to fuel the engine. In a preferred mode of operation, the engine is started using a mixture rich in the catalyst fuel and then the proportion of ammonia is adjusted for preferred operation. This application is focused on adjusting the engine conditions to target zero emissions, rather than focusing on the exhaust gas products produced by the engine.

"Operating limits for Ammonia Fuel Spark-ignition Engine", Mounaïm-Rousselle et al. Energies 2021, 14(14), 4141 provides an up-to-date review of the possibility of using ammonia as a carbon-free fuel. The discussion contemplates the issues with NOx production and looks at options for reducing NOx by controlling the engine operation conditions and fuel balance.

The use of ammonia fuel results in an exhaust which has problems of NOx and $N_2O$ but also $NH_3$ and even $H_2$, particularly when hydrogen is used as a co-fuel. Without any after-treatment device, it appears that:

Lean operation leads to high NOx (higher than with gasoline) but low unburnt $NH_3$ Rich operation leads to low NOx but too high unburnt $NH_3$, unacceptable due to the smell and toxicity Increasing $H_2$ quantity at the intake leads to a slightly higher NOx level, very low unburnt $NH_3$ (due to a better combustion efficiency) but with some $H_2$ content at the exhaust.

Accordingly, it is an object of the present invention to provide a system comprising an ammonia-combusting engine with improved exhaust emissions, or at least to tackle problems associated therewith in the prior art, or provide a commercially viable alternative thereto.

According to a first aspect there is provided a system for ammonia combustion and exhaust gas treatment, the system comprising:

an internal combustion engine for combusting ammonia;
an exhaust system comprising an intake for receiving an exhaust gas from the combustion engine, an upstream injector for adding hydrogen gas to the exhaust gas and a downstream catalyst article,
wherein the downstream catalyst article comprises a three-way catalyst (TWC) composition.

As used herein, the terms "upstream" and "downstream" refer to the position of a component relative to the direction of flow of exhaust gas through the exhaust system in use.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

The present invention relates to a system for ammonia combustion and exhaust gas treatment. The system includes an internal combustion engine for combusting ammonia. Internal combustion engines are well known and suitable configurations for engines which combust ammonia and, optionally, hydrogen, are well known in the art.

The system comprises an exhaust system having an intake for receiving the exhaust gas from the internal combustion engine. The exhaust system comprises a flow path which extends from the intake to an outlet to the atmosphere. Along the flow path the hot exhaust gases from the engine pass through one or more exhaust system catalyst articles or filters in order to treat undesirable components of the exhaust. In the present invention, the undesirable components which are key and must be treated are oxides of nitrogen produced in the combustion process.

The exhaust system comprises an upstream injector for adding hydrogen gas to the exhaust gas and a downstream catalyst article. Injectors are well known in the technical field and, indeed, it is commonplace to include injectors of ammonia or hydrocarbons in exhaust systems for diesel or gasoline engines. The present invention relies upon an injector for providing hydrogen gas. This will typically comprise of a valve for controlling the release, connected to an engine controller, and an injection head or nozzle for ensuring ready supply and mixing of the hydrogen with the other exhaust gases.

The downstream catalyst article comprises a three-way catalyst (TWC) composition. A TWC composition is a term well known in the field of gasoline engine exhaust treatment systems. The term TWC refers to the three chemical reactions which take place on the surface of the catalyst. A conventional TWC following a gasoline engine oxidizes exhaust gas pollutants—both hydrocarbons (HC) and carbon monoxide (CO)—and reduces nitrogen oxides (NOx) into the harmless components water ($H_2O$), nitrogen ($N_2$), and carbon dioxide ($CO_2$).

In the context of an ammonia combustion engine, there would only be nitrogen oxides present, but not HC or CO. This means that the TWC cannot operate optimally. Consequentially the injection of hydrogen provides a component which can be oxidised while the NOx is reduced.

As discussed above, it is apparent that in pure ammonia and ammonia-fuel blends, especially ammonia-hydrogen mixture-driven combustion engines, $NO_x$ emissions are a critical problem. The solution adopted in the prior art to date has involved careful engine management to control the nature of emissions. However, this is not always possible, especially under conditions of heavy acceleration where the engine cannot respond. Accordingly, in order to prevent this problem, it could be expected that a conventional ammonia oxidation catalyst or catalytic reduction exhaust system could be used. This would allow both $NO_x$ and $NH_3$ to be addressed.

However, the present inventors have found that the selection of the exhaust system components is not so straightforward. In particular, the inventors have found that the provision of a three-way catalyst (TWC) is especially desirable because they generally have good hydrothermal stability. However, the inventors found that the TWC performs poorly at NOx reduction. Without wishing to be bound by theory, it is believed that this is because of an absence of hydrocarbons and CO from an ammonia engine. The inventors have found that by supplementing the exhaust gases directly with additional hydrogen they can overcome this problem. This allows the provision of an optimised hydrothermally stable catalyst which has good NOx treatment performance. Moreover, this is advantageous over HC injection, since it has been found to operate better at lower temperatures. In addition, the hydrogen can be produced in situ from the ammonia used as the engine fuel.

Moreover, there are obvious cost and design benefits which apply when adapting a known catalyst article from the gasoline engine exhaust system technical field and applying it to the new field of ammonia-combustion engines.

Preferably the internal combustion engine further comprises a controller for maintaining stoichiometric engine conditions. Three-way catalysts are effective when the engine is operated within a narrow band of air-fuel ratios near the stoichiometric point, such that the exhaust gas composition oscillates between rich (excess fuel) and lean (excess oxygen). Conversion efficiency falls very rapidly when the engine is operated outside of this band. Under lean engine operation, the exhaust contains excess oxygen, and the reduction of NOx is not favoured. Under rich conditions, the excess fuel consumes all of the available oxygen prior to the catalyst, leaving only oxygen stored in the catalyst available for the oxidation function.

Oxygen sensors can be used to provide feedback to keep the air-fuel ratio (AFR) within the desired window as much as possible, the feedback causes perturbation about the stoichiometric point, meaning that the catalyst will alternately see slightly rich and slightly lean conditions.

Preferably the system further comprises an ammonia storage vessel and/or a hydrogen storage vessel. The ammonia may be provided in a number of different forms and the type of storage required will depend on the form of ammonia provided. The ammonia may desirably be provided as a liquid or a gas and, in these instances, the most suitable storage vessel will be a high-pressure cylinder. Alternatively, the ammonia may be provided as a solid, such as adsorbed onto a material, such as a metal halide, or covalently bonded within a metal complex. In these instances, the storage requirements may differ. Suitable ammonia storage systems are well known in the art.

The hydrogen may similarly be provided in a number of different forms. For example, it may be provided as a compressed gas, or may be adsorbed onto a material. Alternatively, the hydrogen may be stored as part of a solid, such as a lithium metal halide. Heat treatment of the solid can be used to liberate hydrogen as required.

Alternatively, the system may be free from a hydrogen storage vessel and may instead rely on the generation of hydrogen in situ from the stored ammonia. This can be achieved by catalytic or electrolytic reactions to provide hydrogen as required.

A TWC composition is typically provided as one or more washcoated layers or zones on a porous substrate. Suitable porous substrates for the TWC composition include a flow-through substrate or a wall-flow filter substrate. Most preferred the substrate is a flow-through substrate. Suitable materials for forming the porous substrate include ceramic-like materials such as cordierite, silicon carbide, silicon nitride, zirconia, mullite, spodumene, alumina-silica-magnesia or zirconium silicate, or of porous, refractory metal.

Such materials are able to withstand the environment, particularly high temperatures, encountered in treating the exhaust streams and can be made sufficiently porous. Such materials and their use in the manufacture of porous monolith substrates is well known in the art. Preferably the porous substrate prior to coating has a porosity of 30-70%, such as 40-65%, most preferably >50%, such as >55% e.g. 55-70%. Suitable techniques for determining porosity are known in the art and include mercury porosimetry and x-ray tomography.

Preferably the TWC composition is provided on from 25 to 75% of an axial length of the substrate, extending from an upstream end of the substrate.

The provision of the composition on the upstream end of the substrate may be accompanied with a downstream catalyst composition provided for catching any ammonia and hydrogen slip. Suitable catalysts are known generally as ammonia slip catalysts (ASC) and comprise platinum group metals to oxidise these species. The ASC is preferably provided on from 25 to 75% of an axial length of the substrate, extending from a downstream end of the substrate.

Accordingly, in one embodiment the system preferably further comprises a PGM-containing slip catalyst arranged downstream of the downstream catalyst article for converting slipped hydrogen to water and/or for converting slipped ammonia to nitrogen and water. According to another embodiment, preferably the downstream catalyst article further comprises a PGM-containing slip catalyst composition arranged extending from an outlet end of the downstream catalyst article for converting slipped hydrogen to water and/or for converting slipped ammonia to nitrogen and water.

Generally, a TWC composition comprises three parts: alumina; an oxygen storage component (OSC), such as a ceria-zirconia mixed oxide; and platinum group metals (PGM) supported on one or both of the alumina and OSC.

TWC compositions are generally provided in washcoats. Layered TWC catalysts can have different compositions for different layers. Traditionally, TWC catalysts can comprise washcoat layers having loadings of up to 2.5 g/in$^3$ and total loadings of 5 g/in$^3$ or more.

The application may be characterised as "on wall" application or "in wall" application. The former is characterised by the formation of a coating layer on a surface of a channel. The latter is characterised by the infiltration of catalytic material into the pores within the porous material. The techniques for "in wall" or "on wall" application can depend on the viscosity of the material applied, the application technique (spraying or dipping, for example) and the presence of different solvents. Such application techniques are known in the art. Suitable coating methods are described in WO 2011/080525, WO 99/047260, WO 2014/195685 and WO 2015/145122, which are incorporated herein by reference.

The porous substrate has a first face and a second face defining a longitudinal direction therebetween and at least a first plurality of channels extending in the longitudinal direction and providing a first plurality of inner surfaces. In use, one of the first face and the second face will be the inlet face (or inlet end) for exhaust gases and the other will be the outlet face (or outlet end) for the treated exhaust gases.

Preferably the TWC composition comprises a platinum group metal (PGM) component comprising one or more of Pt, Pd and Rh. These exhibit good activity and long life.

Preferably the one or more platinum group metals is selected from a combination of two or more of Pt, Pd and Rh. The platinum group metals serve to catalyse the reactions required to remediate the exhaust gases. Preferably the platinum group metal is Pt, Pd and Rh; Pd and Rh; or Pd only; or Rh only. More preferably the PGM component comprises a mixture of Pd and Rh.

Preferably the TWC composition comprises a support material. Preferably the TWC comprises alumina. This is an advantageous carrier material since it has a high surface area and is a refractory metal oxide. In other words, the alumina serves as a refractory support material. This lends the catalyst composition good thermal capacity which is required for the high-temperature conditions encountered. Preferably, the alumina is gamma-alumina or theta-alumina, which may provide improved hydrothermal stability.

Preferably the TWC composition comprises an oxygen storage component (OSC). This permits the TWC to store oxygen from the exhaust gas stream, usually when the air-fuel ratio goes lean. When sufficient oxygen is not available from the exhaust stream, the stored oxygen is released and consumed. A lack of sufficient oxygen occurs either when oxygen derived from NOx reduction is unavailable or when certain manoeuvres such as hard acceleration enrich the mixture beyond the ability of the converter to supply oxygen.

Suitable OSCs comprise or consist of one or more mixed oxides. Preferably the OSC comprises a ceria and zirconia mixed oxide optionally including one or more rare earth elements. Preferably the rare earth elements comprise one or more of praseodymium, lanthanum, yttrium, and neodymium.

Preferably the ratio by weight of OSC to alumina is from 15:85 to 85:15, more preferably from 30:70 to 70:30 and most preferably about 50:50.

The alumina and OSC are usually intimately mixed and applied to a substrate, such as a ceramic honeycomb, in a washcoat. The PGMs can be impregnated on one or both of the alumina and OSC and either before making up the washcoat, or by adding it to the washcoat. Impregnation of the PGM before making up the washcoat enables the formulator to choose which component is to support a PGM. For example, the rhodium can be supported solely by the OSC and the platinum solely by the alumina. An alternative arrangement is to have the components and/or PGMs in separate layers one above the other.

Most preferably the TWC comprises Pd and Rh, provided on an alumina support, together with an oxygen storage composition. Such a mixture constitutes the most typical configuration of a TWC catalyst article.

Preferably the TWC composition comprises ruthenium. Where ruthenium is employed in the catalyst composition, the ruthenium may be impregnated onto a suitable support material, for example a rutile phase titania support. The inclusion of ruthenium in the catalytic composition has been found to favour low $N_2O$ production in the presently disclosed system for combusting ammonia.

Preferably the $H_2$ is dosed in an amount sufficient to optimise to TWC performance, such that the NOx production is minimised. The amount of hydrogen which needs to be dosed will fluctuate in operation of the system. One way to determine the amount that is required is with a NOx sensor. Preferably the system further comprises a NOx sensor arranged upstream or downstream of the downstream catalyst article. These sensors permit the system to adjust the addition of hydrogen based on measurements obtained from the NOx sensor.

According to a further aspect, there is provided a method for the treatment of an exhaust gas from an ammonia internal combustion engine, the method comprising:

injecting hydrogen gas into the exhaust gas upstream of a TWC catalyst.

Preferably the method is a method for the treatment of an exhaust gas produced by and treated within the system disclosed herein.

FIGURES

The invention will now be described further in relation to the following non-limiting figures, in which:

FIG. 1 shows a system in accordance with the present invention.

FIG. 1 shows an ammonia-combustion and exhaust gas treatment system 32. The system 32 comprises an ammonia-combustion engine 30 having a manifold 40 for passing exhaust gas from the ammonia-combustion engine 30 into an exhaust gas duct 34.

The exhaust gas duct 34 conveys the exhaust gas to a TWC catalyst article 50 as described herein, and then the treated exhaust gas is released to the atmosphere 36. Before the exhaust gas enters the TWC catalyst article 50 it is dosed with hydrogen 46 from a hydrogen dosing spray 48.

The TWC catalyst article 50 may be a washcoated catalyst article as described herein. This can be provided with an integrated downstream ASC composition to handle any slipped $H_2$ or $NH_3$.

The term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. A system for ammonia combustion and exhaust gas treatment, the system comprising:
    an internal combustion engine for combusting ammonia; and
    an exhaust system comprising an intake for receiving an exhaust gas from the combustion engine, an upstream injector for adding hydrogen gas to the exhaust gas and a downstream catalyst article,
    wherein the downstream catalyst article comprises a three-way catalyst (TWC) composition.

2. The system according to claim 1, wherein the internal combustion engine further comprises a controller for maintaining stoichiometric engine conditions.

3. The system according to claim 1, wherein the system further comprises an ammonia storage vessel and/or a hydrogen storage vessel.

4. The system according to claim 1, wherein the TWC composition is provided on a flow-through substrate or a wall-flow filter substrate.

5. The system according to claim 4, wherein the TWC composition is provided on from 25 to 75% of an axial length of the substrate, extending from an upstream end of the substrate.

6. The system according to claim 1, wherein the TWC composition comprises:
    (i) a platinum group metal component comprising one or more of Pt, Pd and Rh;
    (ii) a support material; and
    (iii) an oxygen storage component (OSC).

7. The system according to claim 1, wherein the TWC composition comprises ruthenium.

8. The system according to claim 1, the system further comprising a NOx sensor arranged upstream or downstream of the downstream catalyst article, wherein the system is configured to adjust the addition of hydrogen based on measurements obtained from the NOx sensor.

9. The system according to claim 1, wherein the system further comprises a PGM-containing slip catalyst arranged downstream of the downstream catalyst article for converting slipped hydrogen to water and/or for converting slipped ammonia to nitrogen and water.

10. The system according to claim 1, wherein the downstream catalyst article further comprises a PGM-containing slip catalyst composition arranged extending from an outlet end of the downstream catalyst article for converting slipped hydrogen to water and/or for converting slipped ammonia to nitrogen and water.

* * * * *